United States Patent
Geraci et al.

(10) Patent No.: US 9,704,109 B2
(45) Date of Patent: Jul. 11, 2017

(54) COMMUNITY TRAVEL BOOKING

(71) Applicant: Amadeus S.A.S., Sophia Antipolis (FR)

(72) Inventors: Frederic Geraci, Mouans-Sartoux (FR); Frederic Laruelle, Antibes (FR)

(73) Assignee: Amadeus S.A.S., Biot (FR)

( * ) Notice: Subject to any disclaimer, the term of this patent is extended or adjusted under 35 U.S.C. 154(b) by 218 days.

(21) Appl. No.: 13/852,540

(22) Filed: Mar. 28, 2013

(65) Prior Publication Data

US 2014/0297337 A1    Oct. 2, 2014

(51) Int. Cl.
*G06Q 10/02* (2012.01)
*G06Q 30/06* (2012.01)

(52) U.S. Cl.
CPC ........... *G06Q 10/02* (2013.01); *G06Q 10/025* (2013.01); *G06Q 30/0631* (2013.01)

(58) Field of Classification Search
CPC .............................. G06Q 10/02; G06Q 10/025
USPC .............................................. 705/5, 7; 715/7
See application file for complete search history.

(56) References Cited

U.S. PATENT DOCUMENTS

| | | |
|---|---|---|
| 6,876,977 B1 | 4/2005 | Marks |
| 7,219,072 B1 | 5/2007 | Sundaresan |
| 7,647,247 B2 | 1/2010 | Abraham et al. |
| 8,015,071 B2 | 9/2011 | Crespo et al. |
| 8,719,251 B1 * | 5/2014 | English et al. ............... 707/713 |
| 8,739,044 B1 * | 5/2014 | Varadarajan .......... G06F 3/0481 709/204 |
| 2002/0065688 A1 * | 5/2002 | Charlton ................ G06Q 10/02 705/5 |
| 2002/0083134 A1 | 6/2002 | Bauer et al. |
| 2005/0021626 A1 * | 1/2005 | Prajapat et al. ............... 709/205 |
| 2006/0206363 A1 * | 9/2006 | Gove ................... 705/6 |
| 2008/0177641 A1 | 7/2008 | Herniak et al. |
| 2011/0231212 A1 * | 9/2011 | Hurley et al. .................... 705/5 |
| 2012/0310826 A1 * | 12/2012 | Chatterjee ...................... 705/41 |

FOREIGN PATENT DOCUMENTS

WO    2012037559 A1    3/2012

OTHER PUBLICATIONS

Fitzpatrick et al., Group Travel Planner, Mar. 1, 2004, IP.com Prior Art Database Technial Disclosure; Sony Electronics, Inc.*

* cited by examiner

*Primary Examiner* — Brian Epstein
*Assistant Examiner* — Rupangini Singh
(74) *Attorney, Agent, or Firm* — Thompson Hine LLP

(57) ABSTRACT

A community travel booking operation includes a collaborative or common portion or phase during which multiple travelers in a community are permitted to collaboratively search for travel recommendations and select a travel recommendation for the community, as well as an individual portion or phase during which travelers in the community individually purchase, book or otherwise complete individual reservations for the community's selected travel recommendation. By separating the booking operation into collaborative and individual portions or phases, travelers are permitted to collaborate on the selection of a travel recommendation, yet each traveler is then able to complete the booking of their own respective reservation without necessarily having to share personal or payment information with the other travelers in the community.

28 Claims, 12 Drawing Sheets

COMMUNITY TRAVEL BOOKING

FIELD OF THE INVENTION

The invention generally relates to computers and computer software, and in particular, to computers and computer software for use in selecting and booking travel reservations.

BACKGROUND OF THE INVENTION

Travelers are increasingly relying on the Internet to book travel reservations. For air travel, as an example, travelers may access airline web sites and/or third party travel web sites to search for different travel recommendations meeting a desired search criterion, such as a particular departure city or airport, destination city or airport, departure time and date, return time and date, and price. Other options, such as number of connections, travel class, etc. may also be specified to enable a traveler to select a particular travel recommendation best meeting the traveler's needs.

Online booking is typically a very individualized process, where a single individual, such as a traveler or a travel agent representing the traveler, inputs the desired search criterion into a web site, browses the search results, selects a desired travel recommendation, and completes the reservation by inputting personal information about the traveler as well as appropriate payment information. Often this is performed during an online "session" between the individual and the web site, and the web site maintains a session identifier that is provided to the individual's computer so that whenever the individual's computer sends a message to the web site, the web site can associate the message with that individual's session.

Where multiple travelers are planning on traveling together, multiple reservations may be booked together; however, a single traveler typically handles the booking process, including inputting the personal information about each traveler and securing a single payment to cover all of the reservations. For larger groups of travelers, such as 10 or more travelers, a completely different business process is typically used, often using a separate group sales system, to accommodate the particular needs of larger groups of travelers.

For smaller groups of travelers (e.g., groups smaller than 10 travelers), however, individual bookings may be difficult to coordinate. For example, if two couples are planning a trip to a vacation destination, the couples may tentatively agree in person, over the phone, or via text or email as to a particular destination, and on rough dates and times. One traveler from that group may then access one or more travel-related web sites to locate one or more potential travel recommendations, and then send those travel recommendations to the other travelers to get their feedback as to preferred dates, times and costs, often either via phone call, email, text, or some other form of electronic communication. Unless all travelers agree on the same travel recommendation, additional searching and distribution of additional travel recommendations to the other travelers may be required, leading to further delays.

Then, when all travelers finally assent to the same travel recommendation, a reservation must be booked for all travelers. In some instances, the traveler that coordinated the search may complete the reservation for all of the travelers, entering personal information for each traveler and paying for all of the reservations in a single credit card transaction. At some later point, the other travelers may repay that traveler for their own reservations, albeit with the possible stress on the relationships that sometimes occurs when friends owe money to one another. In addition, the traveler that coordinated the search may not have the necessary personal information for all of the travelers in the group, or some travelers may be not willing to provide that information.

As such, in some instances, the travelers in a group may agree to individually complete their respective reservations. To do so, however, each traveler is typically required to initiate a new online session with the web site, re-enter the original search to locate the previously agreed-upon travel recommendation, and complete the reservation for that traveler (and possibly other related travelers such as spouses or other family members). When different travelers later initiate new online sessions, however, a risk exists that the availability and/or price of an agreed-upon travel recommendation may change before all travelers can complete their respective reservations, possibly leading to some travelers being forced to pay higher fees or choose alternative arrangements.

Consequently, a significant need continues to exist in the art for an improved manner of coordinating the selection and booking of travel reservations for groups of travelers.

SUMMARY OF THE INVENTION

The invention addresses these and other problems associated with the prior art by utilizing community travel booking operations to book reservations for multiple travelers. A community travel booking operation includes a collaborative or common portion or phase during which multiple travelers in a community are permitted to collaboratively search for travel recommendations and select a travel recommendation for the community, as well as an individual portion or phase during which travelers in the community individually purchase, book or otherwise complete individual reservations for the community's selected travel recommendation. By separating the booking operation into collaborative and individual portions or phases, travelers are permitted to collaborate on the selection of a travel recommendation, yet each traveler is then able to complete the booking of their own respective reservation without necessarily having to share personal or payment information with the other travelers in the community.

Therefore, consistent with one aspect of the invention, travel reservations are booked for a community of travelers by interacting collaboratively with the community of travelers to select a community travel recommendation, and interacting individually with each of a plurality of travelers in the community of travelers to complete a reservation of the selected community travel recommendation for each of the plurality of travelers.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize community travel booking to provide the ability for multiple travelers to search for and complete reservations for one or more common travel recommendations. In the illustrated embodiments, a portion or phase of a community travel booking operation, e.g., searching for and selecting travel recommendations, is performed collectively by multiple travelers, while another portion or phase of the community travel booking operation, e.g., booking or otherwise purchasing reservations for selected travel recommendations, is performed individually by those travelers.

Figure 1:
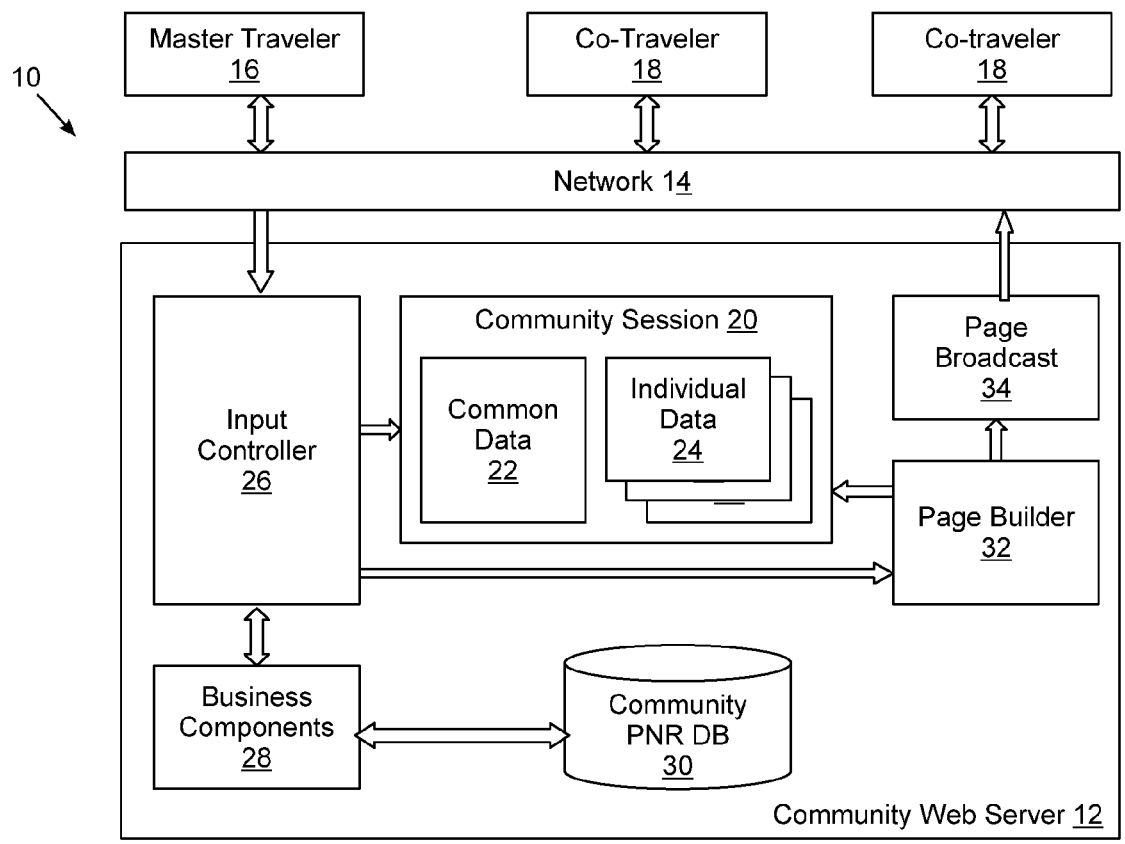
FIG. 1 is a block diagram of community travel booking system consistent with the invention.

Turning now to the Drawings, wherein like numbers denote like parts throughout the several views, FIG. 1 illustrates an example data processing system 10 in which community travel booking consistent with the invention may be implemented. System 10 is illustrated as including a central community travel booking service implemented by a community web server 12, which is interfaced over a public and/or private network 14, e.g., the Internet, with a plurality of traveler devices, e.g., a master traveler device 16 and a plurality of co-traveler devices 18, which are typically operated by a plurality of travelers that collectively form a "community" of travelers for the purposes of the invention.

In particular, a community refers to a collection of individuals desiring to book, or purchase a reservation for, a common travel recommendation, i.e., such that all of the reservations booked for the community are for the same travel recommendation (referred to herein as a "community travel recommendation"). In this regard, a travel solution refers to an itinerary between a particular origin and destination, e.g., as may be determined by a travel solution building system, and a travel recommendation is a travel solution coupled with an associated price. Travel solutions, as well as travel recommendations, may be mono-segment or multi-segment, may be one-way, multi-city, or round-trip, and may be associated with ticketed travel over air, rail, road or water. A reservation of a travel solution or travel recommendation therefore may be an airline reservation, train reservation, cruise reservation, bus reservation, etc. Moreover, a travel recommendation comprising a travel solution and a price may be determined in a single step process (e.g., by retrieving a travel solution and an associated price), a multi-step process (e.g., by retrieving a plurality of travel solutions to determine availability, then determining and presenting prices for one or more selected travel solutions, or in other manners that will be appreciated by one of ordinary skill in the art having the benefit of the instant disclosure, e.g., via price-driven searches, pre-shopping map searches, and the like).

Each individual in a particular community is referred to herein as a traveler or co-traveler, although the participation of a particular individual in a community may vary from individual to individual. An individual is a "traveler" or "co-traveler" to the extent that a reservation is booked for the individual during the course of a community travel booking operation, and in some embodiments all co-travelers will be booked in the same reservation record. A traveler may participate in all phases of a community travel booking operation, or may only participate in a portion of the operation. For example, some travelers may participate in the search and/or selection of a travel recommendation, while other travelers may participate only in completing a reservation of a previously-selected travel recommendation. In addition, in some instances one traveler may complete a reservation on behalf of another traveler. Thus, for example, if a wife completes a reservation for herself and her husband, the wife and husband are both travelers even though the husband does not access the community travel booking service. To distinguish these different roles, travelers or co-travelers may be considered to be either primary co-travelers or accompanying co-travelers, with the former participating in at least a portion of the community travel booking operation, and the latter typically not participating in any portion of the operation but otherwise being included in a reservation as a result of their personal information being entered by a primary co-traveler. Support for accompanying co-travelers may be optional or excluded in some embodiments.

In the illustrated embodiment, as noted above, the community travel booking service is implemented in a community web server 12, and in this regard, a community travel booking operation is performed within the context of a community session 20, which in the context of a web server application may be implemented as an online or HTTP session that links together each traveler in the community. A community session 20 is typically identified by a unique identifier, e.g., a community session ID, generated by community web server 12. In addition, within the context of each community session 20, each traveler is assigned a traveler identifier, or traveler ID, which is allocated by the web server as soon as a traveler joins the community. As such, the couple [Community Session ID|Traveler ID] provides a unique key to identify each traveler accessing the community web server and associate that traveler with a particular community.

In the illustrated embodiment, in order to manage the resources of the web server (e.g., memory usage and CPU time), a community may be maintained in an active state while at least one traveler is interacts with the web server. As soon as inactivity is detected from all travelers during a specified period of time, a timeout event may be raised and the community session may be deactivated.

Within the context of each community session 20, both common data 22 and individual data 24 are maintained. Common data 22 includes information about the community such as the list of travelers, as well as who among those travelers is designated as a master traveler. Moreover, the common data includes the travel recommendations selected during the common web flow, and typically, but not necessarily, there is only one set of common data for the entire community.

Individual data 24 typically includes specific information of each traveler entered during the individual web flow. Separate individual data 24 is typically maintained for each traveler, and is identified based on the traveler ID.

An input controller 26 is used to process requests sent by each traveler 16, 18. Multithreading may be used to process multiple requests in parallel, and each request typically includes the key [Community Session ID|Traveler ID] to identify the associated traveler making the request. For each request input controller 26 manages the common and the individual data from community session 20 and may call appropriate business components 28 to interact with a database 30 of Community Passenger Name Records (PNRs).

Community PNRs, in this regard, are reservation or database records storing booking or reservation information for the travelers in a community. It will be appreciated that community PNRs may be implemented in a similar manner to group or individual PNRs, or may be implemented as a separate type of PNR. In addition, in some embodiments, a community travel booking operation may generate multiple individual PNRs for the different travelers in a community. The invention is therefore not limited to any particular manner of storing booking or reservation information for the travelers in a community. Typically, however, in some embodiments, a community PNR is a unique dossier or reservation record, potentially aggregating multiple individual PNRs. Thus, for example, a community may be associated with a unique reservation record that in some embodiments may comprise a single community PNR including reservation information for all of the travelers in a community, and in other embodiments may comprise a plurality of linked PNRs, e.g., individual PNRs, each with reservation information for one or more individual travelers in the community.

Input controller 26 may also interact with an output page builder component 32 to prepare appropriate responses to received requests. In particular, page builder 32 is configured to dynamically build web pages or to otherwise generate responses to traveler requests in a format that is appropriate for the particular client device 16, 18 for each traveler. Page builder 32 also manages different views for a community. In particular, the page builder controls whether a community is in a common view or an individual view, and as such whether a common flow or individual flow is used when interacting with travelers in a community. For example, a multi-traveler page may be used in a common flow, whereas individual pages are used for an individual flow.

Page builder 32 interacts with a page broadcast component 34 that forwards pages to the travelers in a community and identified by the key [Community Session ID|Traveler ID]. It will be appreciated that depending upon the type of client, pages may be formatted in different client-appropriate manners. In addition, in some embodiments responses may be sent in a non-web format, e.g., where a client device includes a dedicated application that is used in lieu of a desktop or mobile browser. Thus, while the terms "page builder" and "page broadcast" are used herein, it will be appreciated that the manner in which a community travel booking service interacts with client devices is not limited to web-based protocols.

Figure 2:
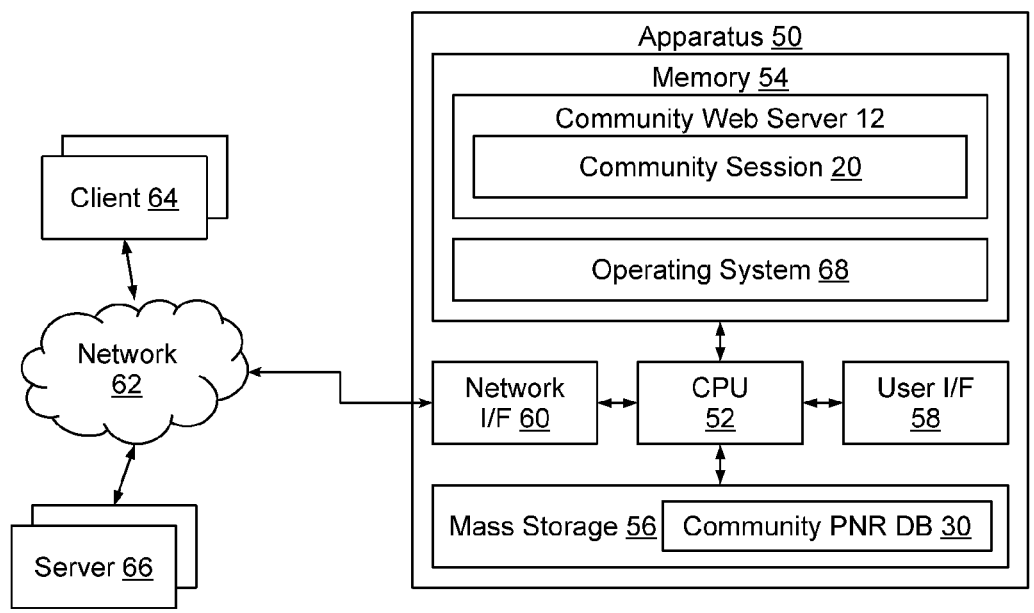
FIG. 2 is a block diagram of an example implementation of a computer system capable of implementing at least a portion of the system referenced in FIG. 1.

Community web server 12 may be implemented in a number of manners consistent with the invention. FIG. 2, for example, illustrates an exemplary apparatus 50 within which various steps from a community travel booking operation may be implemented in a manner consistent with the invention. For the purposes of the invention, computer 50 may represent practically any type of computer, computer system or other programmable electronic device. Moreover, computer 50 may be implemented using one or more networked computers, e.g., in a cluster or other distributed computing system, or may be implemented within a single computer or other programmable electronic device, e.g., a desktop computer, laptop computer, handheld computer, cell phone, set top box, etc.

Computer 50 typically includes a central processing unit 52 including at least one microprocessor coupled to a memory 54, which may represent the random access memory (RAM) devices comprising the main storage of computer 50, as well as any supplemental levels of memory, e.g., cache memories, non-volatile or backup memories (e.g., programmable or flash memories), read-only memories, etc. In addition, memory 54 may be considered to include memory storage physically located elsewhere in computer 50, e.g., any cache memory in a processor in CPU 52, as well as any storage capacity used as a virtual memory, e.g., as stored on a mass storage device 56 or on another computer coupled to computer 50. Computer 50 also typically receives a number of inputs and outputs for communicating information externally. For interface with a user or operator, computer 50 typically includes a user interface 58 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 50 may also include one or more mass storage devices 56, e.g., a floppy or other removable disk drive, a hard disk drive, a direct access storage device (DASD), an optical drive (e.g., a CD drive, a DVD drive, etc.), and/or a tape drive, among others. Furthermore, computer 50 may include an interface 60 with one or more networks 62 (e.g., a LAN, a WAN, a wireless network, and/or the Internet, among others) to permit the communication of information with other computers and electronic devices, e.g., one or more client computers 64 (e.g., traveler devices 16, 18 and one or more servers 66 (e.g., implementing other aspects of a community travel booking service, as well as other systems such as inventory systems, revenue management systems, reservation systems, travel search engines, etc.). It should be appreciated that computer 50 typically includes suitable analog and/or digital interfaces between CPU 52 and each of components 54, 56, 58 and 60 as is well known in the art. Other hardware environments are contemplated within the context of the invention.

Computer 50 operates under the control of an operating system 68 and executes or otherwise relies upon various computer software applications, components, programs, objects, modules, data structures, etc., e.g., community web server 12, community session 20 and community PNR database 30 therein. Moreover, various applications, components, programs, objects, modules, etc. may also execute on one or more processors in another computer coupled to computer 50 via network 62, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computer 50. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Community Travel Booking Operations

Travelers are increasingly using eCommerce web sites to book their travel online. For groups of travelers wishing to travel together, traditional booking operations are inconvenient due to an inability for those travelers to share the same information at the same time, as the travelers may not be located at the same place, and even not using the same type of device to access an eCommerce web site, e.g., desktop computer, mobile phone or tablet. In addition, social networking is becoming an increasingly important tool for enabling friends and family to interact and share information. Often, when groups of travelers are trying to arrange a trip, the travelers may attempt to access a web site at separate locations and in separate online sessions while communicating over the phone or via chat or email to attempt to find a particular travel recommendation that meets their respective needs. Furthermore, if any of the travelers are unavailable at the time the other travelers are discussing travel plans, substantial delays may be introduced as the travelers email potential itineraries and travel recommendations back and forth until all travelers agree on a single travel recommendation.

Furthermore, once a travel recommendation is agreed upon, one traveler is required to purchase all of the reservations, or alternatively, each traveler may be required to separately log in, search for the agreed upon travel recommendation, and then book the travel recommendation separately. In the former instance, some travelers may not wish to share some information (e.g., class information, profile information, traveler preferences and services, and payment) with other travelers, while in the latter instance, availability and/or pricing may change for different travelers, risking the possibility that some travelers are unable to complete their reservations.

Embodiments consistent with the invention, on the other hand, introduce the concept of community travel booking to link together individuals while shopping for travel recommendations while allowing for individualized booking confirmation and completion after a travel recommendation has been selected. A community travel booking operation, in particular, may include two portions, phases or steps.

The first, referred to herein as a travel recommendation shopping phase, is an initial phase where the community of travelers collectively browse a travel web site for candidate travel recommendations and select a desired community travel recommendation from among the available alternatives. During this phase, the individuals in the community typically prefer to share a maximum of information such as itinerary, price, booking class, hotel, etc. In the embodiments discussed hereinafter, this phase is implemented using a common web flow, such that collaborative interaction is employed with the community of travelers.

The second, referred to herein as a confirmation or reservation phase, is a phase in which the community of travelers purchase, book or otherwise complete their respective reservations with the selected community travel recommendation. During this phase, individuals typically prefer to maintain much of the relevant information private, e.g., payment information, passport information, and other personal information. In the embodiments discussed hereinafter, this phase is implemented using an individual web flow, such that individual interaction is employed with the community of travelers. In addition, in some embodiments, it is desirable to allow for individuals in a community to confirm their bookings at the same time, or within some time period, i.e., either synchronously or asynchronously.

In some embodiments, a community travel booking operation may provide a traveler with the capability to enter during an individualized web flow private information such as the traveler name, passport, credit card, etc., but still enable the same PNR reservation (referred to herein as a community PNR) to be shared by the entire community. In other embodiments, however, multiple individual PNR reservations may be created, so the invention is not limited to the generation of community PNRs.

In addition, in some embodiments it is desirable to utilize Internet and web browser technologies to provide wide availability of such operations by any device with Internet or network access. In particular, in some embodiments a single online "community" session may be established and maintained in an active state throughout both phases of a community travel booking operation.

Figure 3:
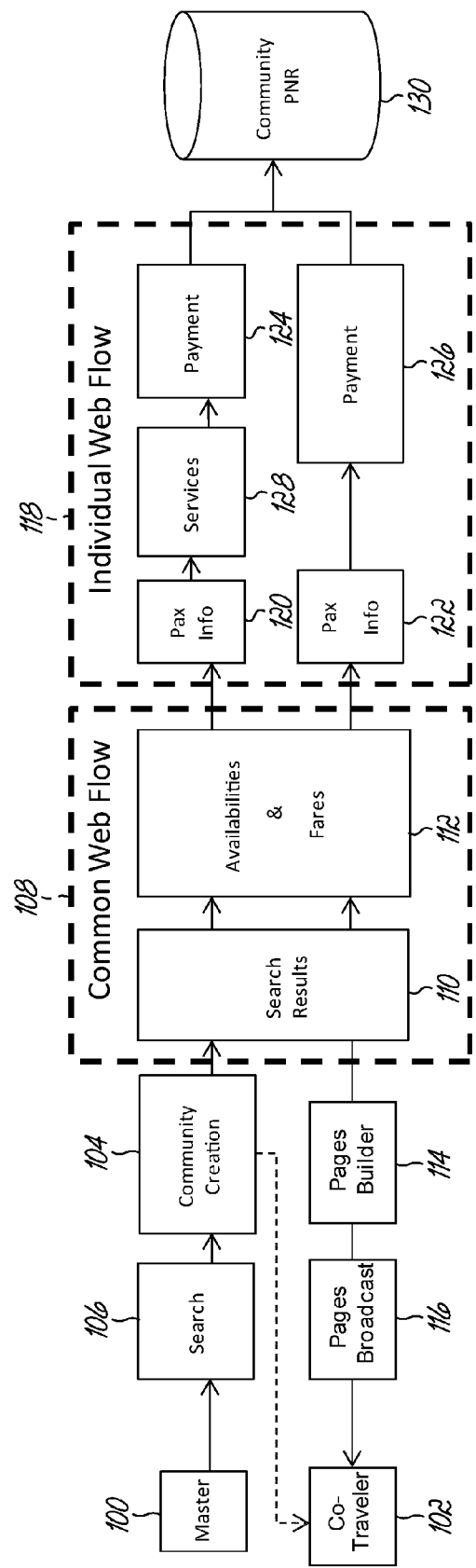
FIG. 3 is a block diagram of a community travel booking operation flow for the system referenced in FIG. 1.

FIG. 3 illustrates an overview of a community travel booking operation consistent with the invention. In this embodiment, a community shopping experience, through the use of co-browsing, is used to enable the participating travelers in a community to share the same community web flow, typically with a single individual, referred to herein as the master traveler 100, controlling the web flow. The other individuals in the community are referred to as co-travelers 102, and these individuals are permitted to view the web flow controlled by the master traveler in real time and thereby participate in the travel recommendation searching and selection process. While the real time updates permit the co-travelers to view the web flow on an ongoing basis as the master traveler interacts with the web site, It will be appreciated that "real time" does not necessarily require that all individuals view the same information at the same exact time, given that communication delays and the like may result in certain traveler devices receiving updates before others.

The master traveler 100 in particular oversees a creation of a community (block 104) as well as a community search operation (block 106). A community travel booking service implements a common web flow 108, during which search results are obtained (block 110) and availabilities and fares are accessed and presented (block 112).

In this embodiment, during the common web flow, common web pages are shared by several individuals in real time, enabling co-travelers to create their trip together. The same page is typically displayed to all users at generally the same time, and only the master traveler is permitted to navigate in the page flow. Web-based push technologies, including, for example, a pages builder component 114 and a pages broadcast component 116, may be used to facilitate this common web flow. For example, a server may utilize any or all of web sockets, HTTP server push, pushlets, long polling and Adobe Flash, among others, to push information between a server and one or more clients. In other embodiments, however, multiple travelers may be permitted to navigate in the common web flow.

In addition, during the common web flow, various methodologies for searching, shopping and/or selecting travel recommendations may be used. For example, travel recommendations may be selected in single or multiple steps, e.g., based on schedule or availability before price, price before schedule or availability, pre-shopping map searches, etc.

It will be appreciated that while the same page is typically broadcast to all online travelers during the common web flow, the same page may be customized by the service for particular travelers, e.g., to customize the page for display on a particular browser, on a particular traveler device, in an application or mobile app instead of a browser, or based on the traveler's role (master or co-traveler). The reference to broadcasting the "same" page therefore is intended to convey that the same candidate travel recommendation, search result and/or travel search criterion information is broadcast to all travelers, even though the actual manner in which that information is packaged or formatted for transmission to and display on a traveler device may vary for different traveler devices (e.g., desktop or laptop computers, tablets, mobile phones, etc.).

Also in this embodiment, once a travel recommendation is selected, the co-travelers proceed to an individual web flow 118 to enter personal information such as passenger information (blocks 120, 122) and payment information (blocks 124, 126). In addition, if desired, some travelers may be permitted to select some specific services or purchase options (block 128). In this case, the community travel booking service sends different pages to each co-traveler, and handles the requests from each co-traveler and updates the individual data in the community session.

In some embodiments, for example, separate web pages may be presented to travelers to obtain passenger information (e.g., last name, first name, address, phone number, etc.), passport/visa information (e.g., Advanced Passenger Information (API)), service information (e.g., specific seats, meals, upgrades, etc.), and payment information (e.g., manner of payment, card number, etc.). In addition, a confirmation page may be presented to provide a traveler with a confirmation number and other information about a completed booking. It will be appreciated the fewer or greater numbers of pages may be presented to travelers, different information may be obtained from and/or displayed to different travelers (even different travelers in the same community), and other flows may be utilized to guide travelers through the booking process.

In this embodiment, an HTTP Session may be created on web server side to handle the community, and all data related to the community may be stored in this session. The result of the operation is creation of a community PNR (block 130).

Now turning to FIGS. 4-17, one example implementation of a community travel recommendation booking service is illustrated in greater detail. It will be appreciated that the flow of a community travel booking operation may vary from that shown in these figures, particularly given the free-form navigation supported by many web technologies. In addition, the example pages illustrated herein are greatly simplified to facilitate an understanding of the illustrated embodiments, and it will be appreciated that practically any travel recommendation searching, selection and confirmation functionality known in the art for booking individual and/or group travel reservations may be utilized in connection with community travel booking operations consistent with the invention.

Figure 4:
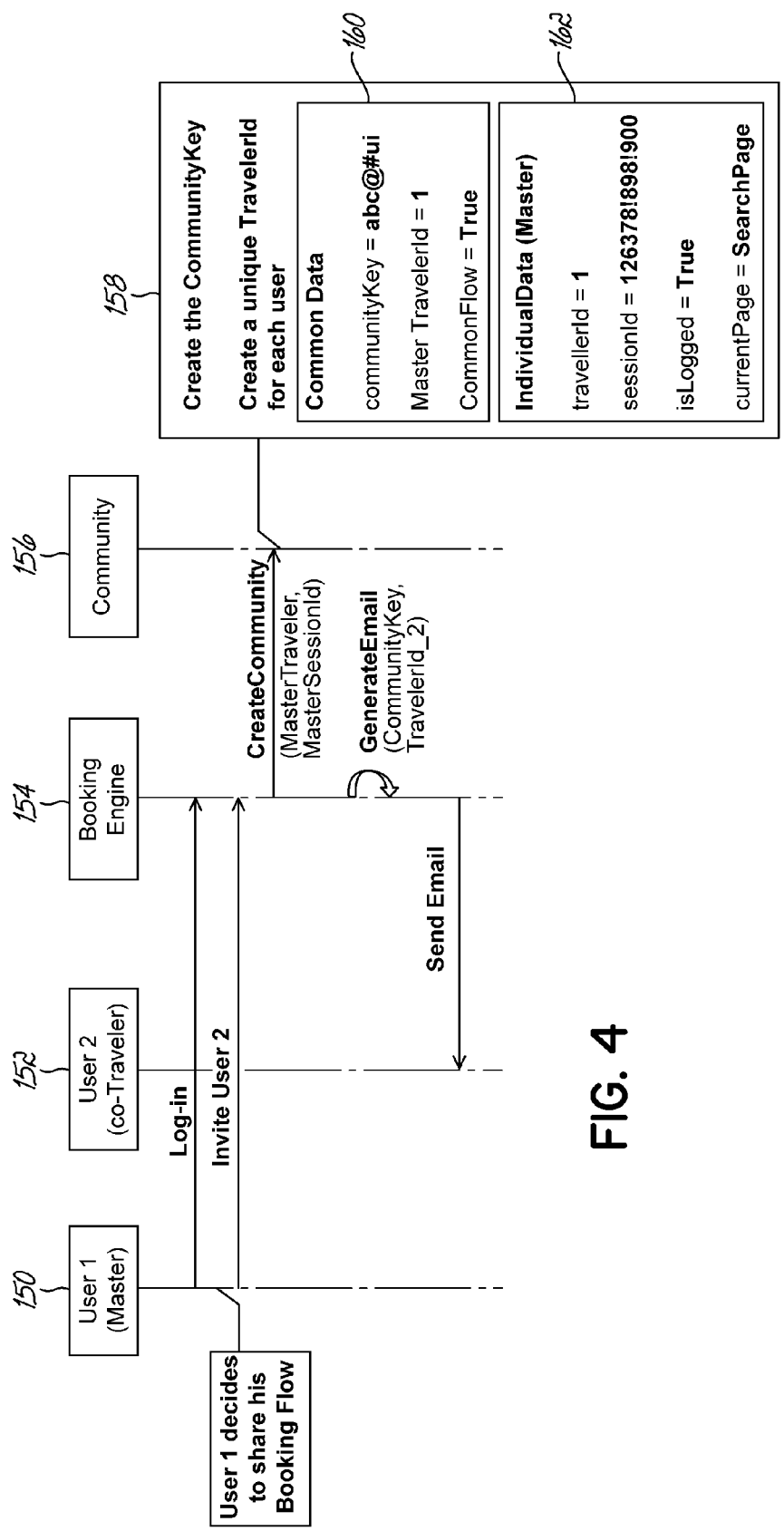
FIG. 4 is a flow diagram illustrating an example community creation operation performed by the system referenced in FIG. 1.

As illustrated in FIG. 4, a community may be created when a first user (referred to as a master traveler 150) decides to share his or her booking flow with a second user (referred to as a co-traveler 152). A booking engine 154, which includes a community component 156 to support community travel booking operation functionality consistent with the invention, interacts with master traveler 150. Booking engine 154 also includes functionality supporting searching and/or selecting travel solution availability (i.e., schedule information without pricing information), pricing information for previously-selected travel solutions, and/or travel recommendations (travel solutions along with respective pricing information), as well as other information associated with travel solutions and/or travel recommendations.

In this example flow, master traveler 150 initially logs in to booking engine 154, and thereafter decides to share the booking flow with a community by inviting co-traveler 152. In response to these operations, booking engine 154 creates a community through the use of a CreateCommunity call to community component 156, passing a MasterTraveler identifier for the master traveler 150 and a MasterSessionID session identifier for the master's session.

Community component 156 creates a community session 158 including common data 160 and individual data 162 for the master traveler. The common data 160 includes a community key identifying the community session, an identifier for the user operating as the master traveler, and a "TRUE" indication that the community session is in a "common flow" phase of a community travel booking operation. The individual data 162 for the master traveler includes the traveler ID for the master traveler, the session ID for that traveler, a "TRUE" indication that the traveler is currently logged in, and a currentPage variable that points to a search page from which to conduct searching for candidate travel recommendations.

Once the community is created, one or more co-travelers may be added to the community by sending email invitations using a GenerateEmail call that provides as input the community key and the traveler ID of any co-travelers to community component 156.

Figure 5:
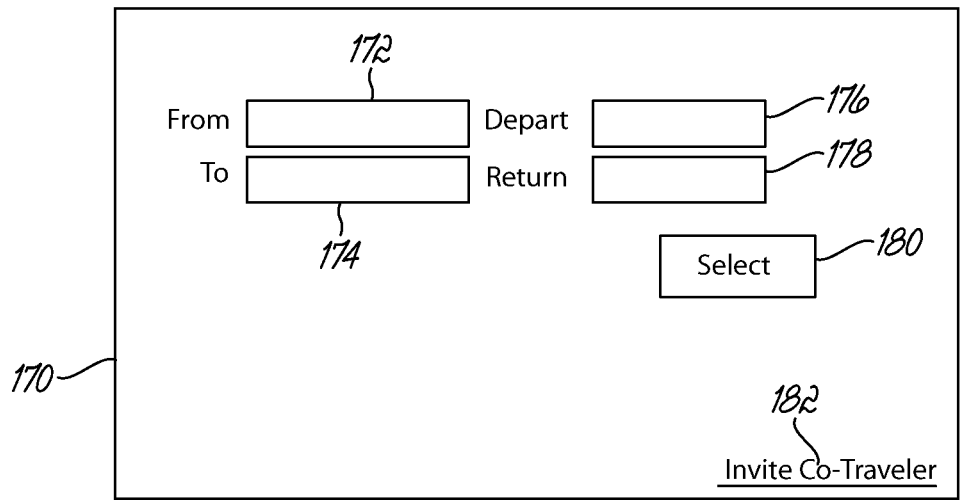
FIG. 5 is a block diagram of an example search page displayed to a master traveler by the system referenced in FIG. 1.
Figure 6:
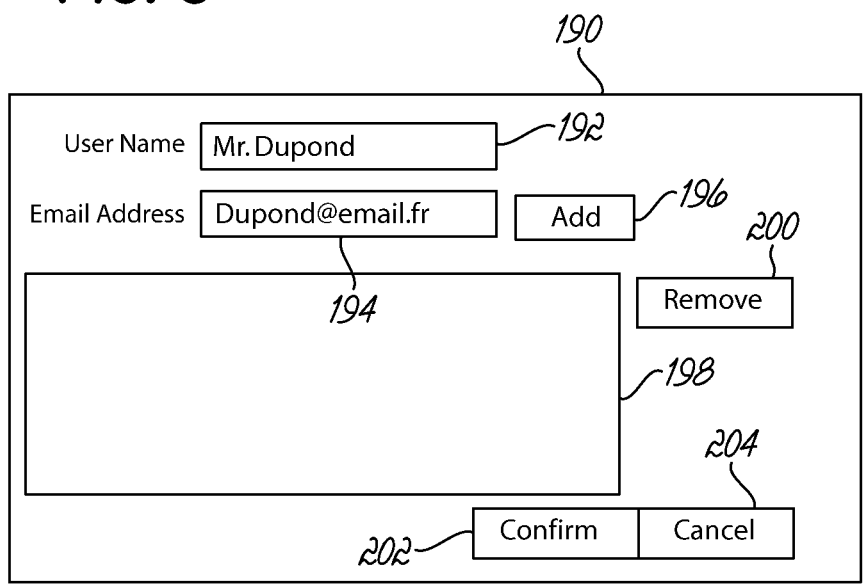
FIG. 6 is a block diagram of an example invite page displayed to a master traveler by the system referenced in FIG. 1.

FIG. 5, for example, illustrates an example search page 170 that enables the first user to enter an origin 172, destination 174, departure date 176 and return date 178, as well as a search button 180 to initiate a search. A link 182 is also provided to enable the first user to effectively create a community by inviting one or more co-travelers to participate in the new community. It will be appreciated that in some embodiments, a community may be created before a search is conducted, while in other embodiments, a community may be created after the first user has performed some searching.

Upon user selection of link 182, an invite page 190 (FIG. 6) may be presented to the first user, including name 192 and email address 194 fields that may be used to add co-travelers to a community. Upon entry of a name and email address and activation of add button 196, co-travelers are added to a list 198. Additional list editing operations, e.g., removing co-travelers via remove button 200, or editing added co-travelers, may also be supported. Once a list of co-travelers is created, selection of confirm button 202 initiates the GenerateEmail call (FIG. 4) and sends emails to the co-travelers in the list. Alternative invite formats, e.g., SMS, chat, etc., may be used in addition to or in lieu of email invites.

Figure 7:
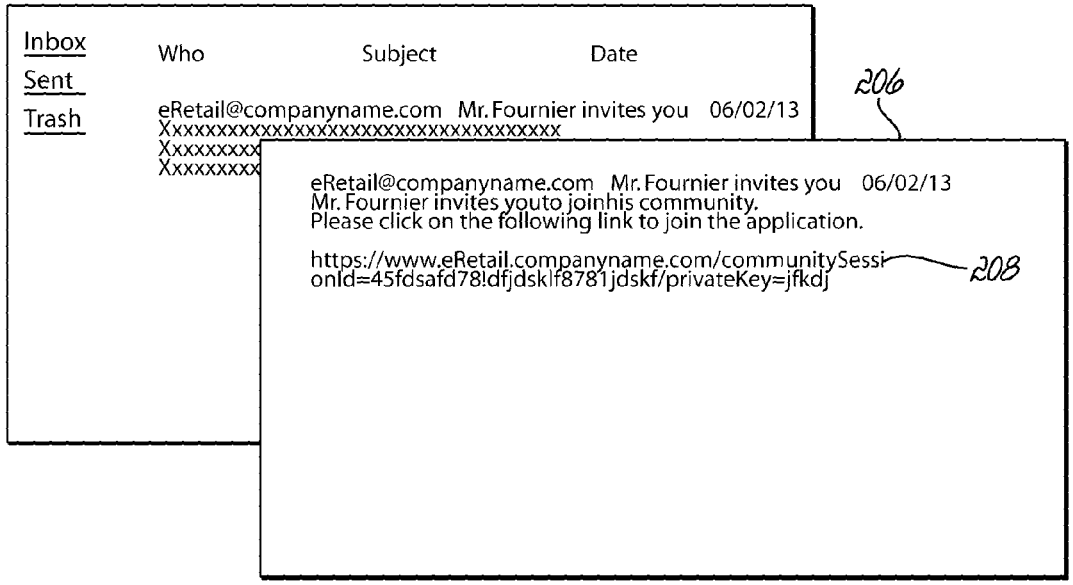
FIG. 7 is a block diagram of an example email invite displayed to a co-traveler by the system referenced in FIG. 1.

An example email invite 206 is illustrated in FIG. 7, and includes a hyperlink to connect to the community. The hyperlink desirably includes a community session ID for the community as well as a private key, generated by the community component and used to identify the co-traveler when the co-traveler joins the community session, and includes an address that permits the co-traveler to connect with the booking engine. In some embodiments, once the co-traveler connects with the booking engine, the co-traveler may be required to log in with a user name and password, or sign up if the co-traveler does not already possess a user account.

Figure 8:
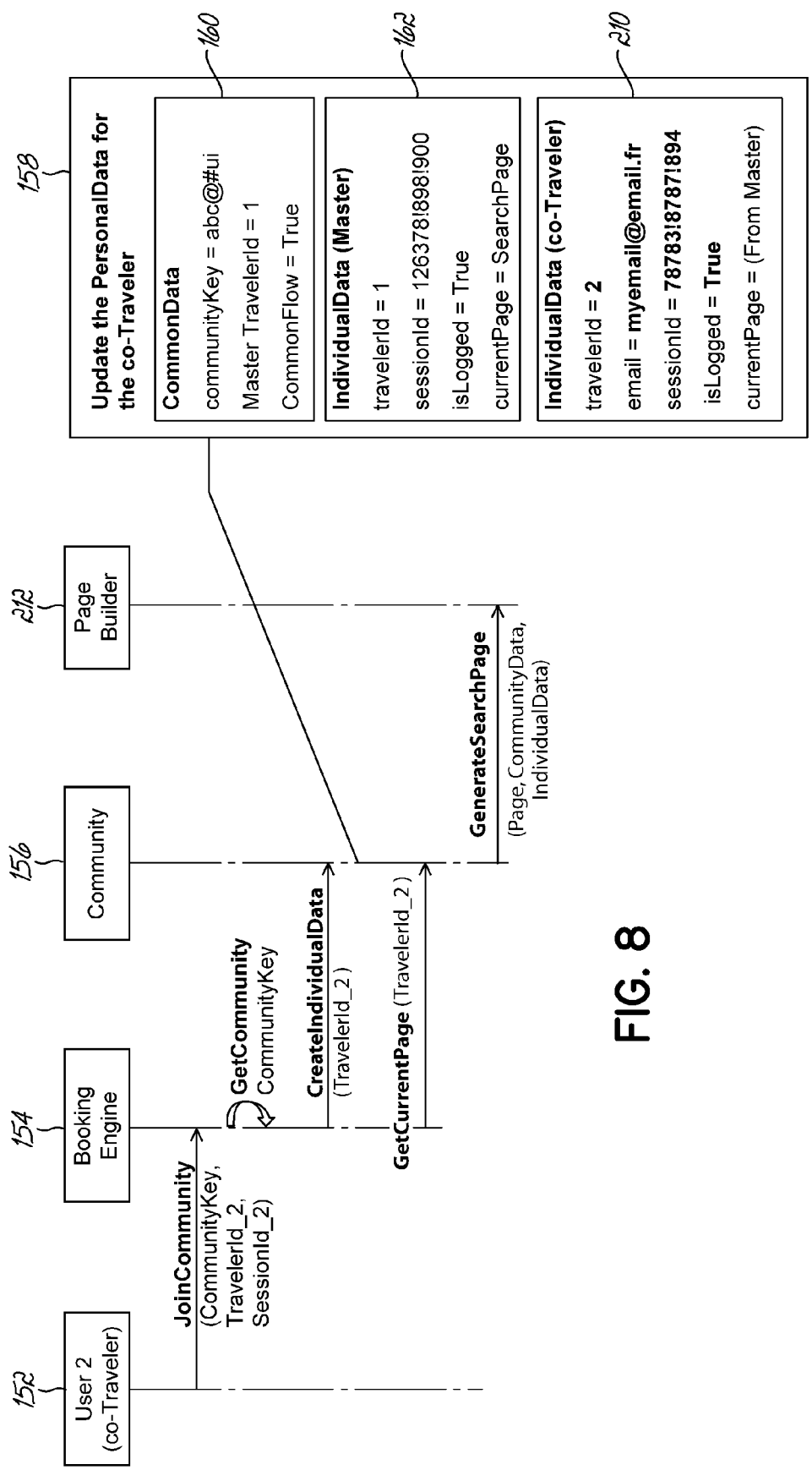
FIG. 8 is a flow diagram illustrating an example community join operation performed by the system referenced in FIG. 1.

FIG. 8 illustrates the operations that occur when a co-traveler joins the community by clicking on the hyperlink. Clicking on the link initiates a JoinCommunity call with booking engine 154, including the community key and traveler ID for the co-traveler, as well as a session ID established for that co-traveler once the co-traveler has connected with the booking engine. Booking engine 154 makes a GetCommunity call to get the community key, and makes a CreateIndividual Data call with the traveler ID of the co-traveler to community component 156 to create individual data 210 for the co-traveler in community session 158. The individual data 210 includes the traveler ID, email and session ID for the co-traveler, as well as a logged in indicator once the co-traveler has logged into the booking engine. In addition, a current page variable for the co-traveler is set to inherit from the master traveler. As such, once individual data for the co-traveler is created, the booking engine may make a GetCurrentPage call to the community component, which in turn makes a GenerateSearchPage call to a page builder component 212 to generate a page to be displayed to the co-traveler, based on the master traveler page as well as other community and individual data.

Figure 9:
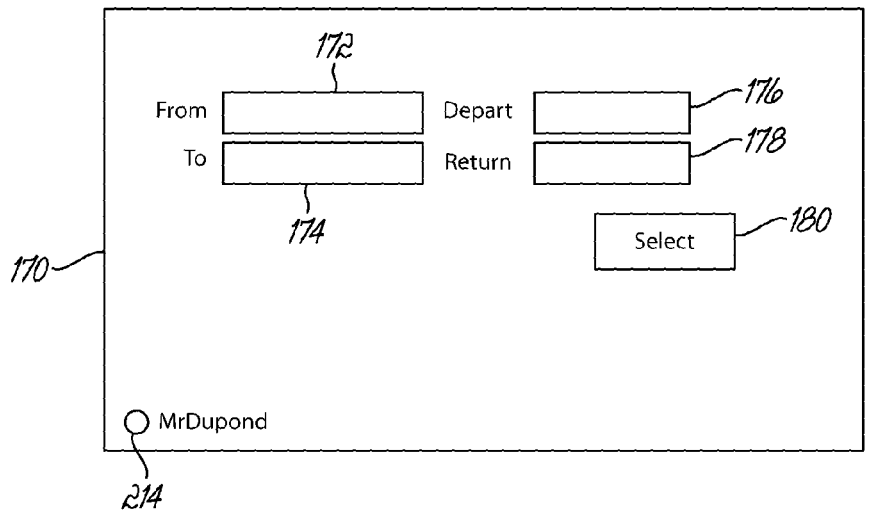
FIG. 9 is a block diagram of the search page of FIG. 5, subsequent to addition of a co-traveler to a community.

For example, the co-traveler may receive the search page 170 that is being displayed to the master traveler. Moreover, as shown in FIG. 9, once one or more co-travelers join the community, both the co-travelers and the master traveler may be notified of a status of each traveler in the community via status indicators such as indicator 214 for the second user. Indicator 214 may identify each traveler, and in some embodiments, an online status. For example, a ball may be displayed next to each traveler in the community, with green identifying a traveler as being online and red identifying the traveler as being offline.

Figure 10:
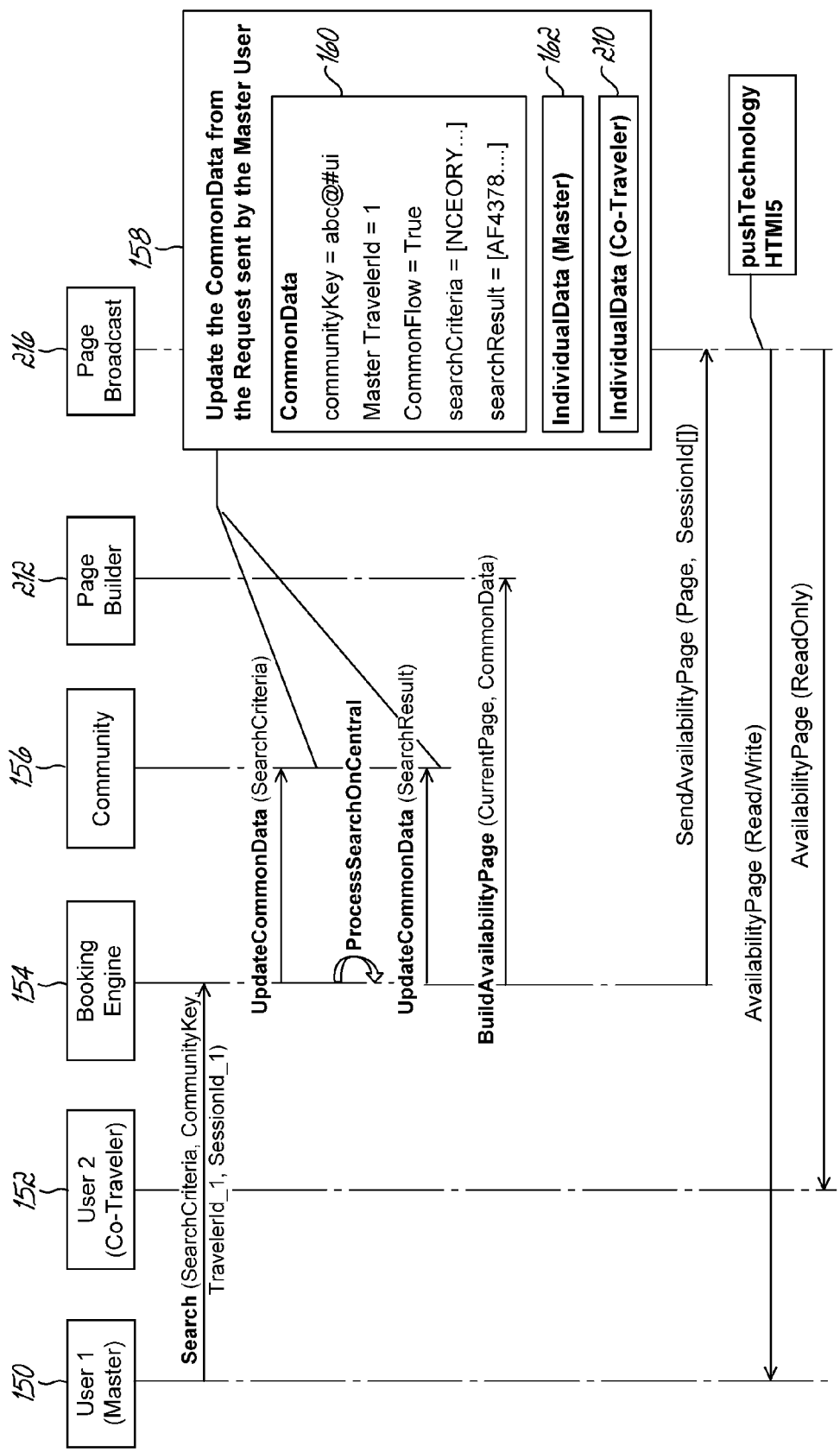
FIG. 10 is a flow diagram illustrating an example common flow performed by the system referenced in FIG. 1.

Next, as illustrated in FIG. 10, once all travelers are logged in and joined to the community, searching and selection of travel recommendations may be performed in a collaborative manner, and based upon a common flow during which all online travelers have access to the web pages generated on behalf of the community, thereby providing collaborative browsing in the traveler devices. In the illustrated embodiment, the master traveler controls the navigation from page to page in the common flow and co-travelers are merely permitted to view the pages generated in response to navigation by the master traveler. In other embodiments, multiple travelers may be permitted to control navigation, and in still other embodiments master travelers may delegate control to co-travelers from time to time such that the traveler that is leading the navigation changes during the common flow.

In addition, during this time additional communication functionality may be supported to enable travelers to communicate with one another using electronic messages while the master traveler navigates from page to page, e.g., using voice, chat, video, etc. Functionality for such communications may be supported directly within the community travel booking service, or alternatively, the travelers in the community may communicate with one another externally, e.g., via external voice, chat, email, video, SMS, mobile phone, social network, conferencing, or other communication technologies. In the latter instance, travelers still view the same web pages, but the communication between those travelers (e.g., to decide which travel recommendation to select) is implemented outside of the community travel booking service. In addition, travelers may be permitted to register their preferences during the common flow, e.g., by enabling co-travelers to "vote" for certain travel recommendations, post messages viewable by the other travelers, or otherwise provide feedback that may alter how the common flow proceeds even though the master traveler has sole control over the common flow.

Thus, for example, a search may be initiate by master traveler 150 through a search request or call to booking engine 154, providing a travel search criterion, along with the community key and the traveler ID and session ID for the master traveler. Prior to conducting the search, an UpdateCommonData call is made with the travel search criterion to update common data 160, and the search is performed by the booking engine (ProcessSearchOnCentral). The common data is again updated with the search results, and a BuildAvailabilityPage call is made to page builder component 212 to build an availability page with the search results. Once the page is built, a SendAvailabilityPage call is made to a page broadcast component 216 to generate availability pages that are automatically pushed to master traveler 150 and co-traveler 152, with the former having read/write access to permit the master traveler to control community flow and the latter having read only access to limit what the co-traveler can control in the community flow.

In the illustrated embodiment, when the master traveler enters data or selects an option from a dropdown list, the changes are pushed to each co-traveler such that each co-traveler is permitted to see the changes on their side in real time. In addition, as soon as the master traveler moves to another page, the new community common page is displayed, at roughly the same time, in each co-traveler browser. Put another way, real time updates, including both navigating to new pages and entering or changing data in existing pages, are pushed to other travelers in the community. As noted above, some coordination can still be by voice, chat, etc., in order to assist the master traveler in the searching and selection but the overall booking is enhanced as all travelers in the community share the same information at the same time.

Figure 11:
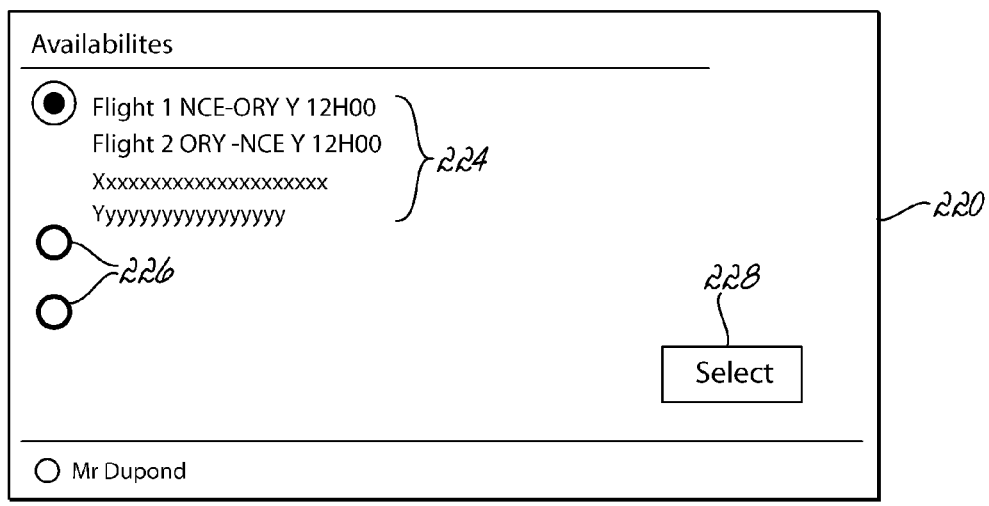
FIG. 11 is a block diagram of an example availability page displayed to a master traveler by the system referenced in FIG. 1.
Figure 12:
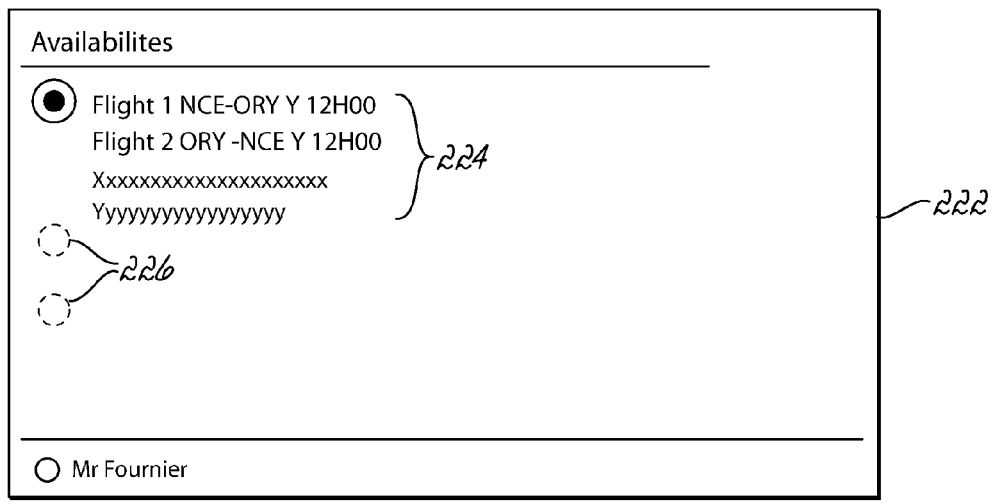
FIG. 12 is a block diagram of an example availability page displayed to a co-traveler by the system referenced in FIG. 1.
Figure 15:
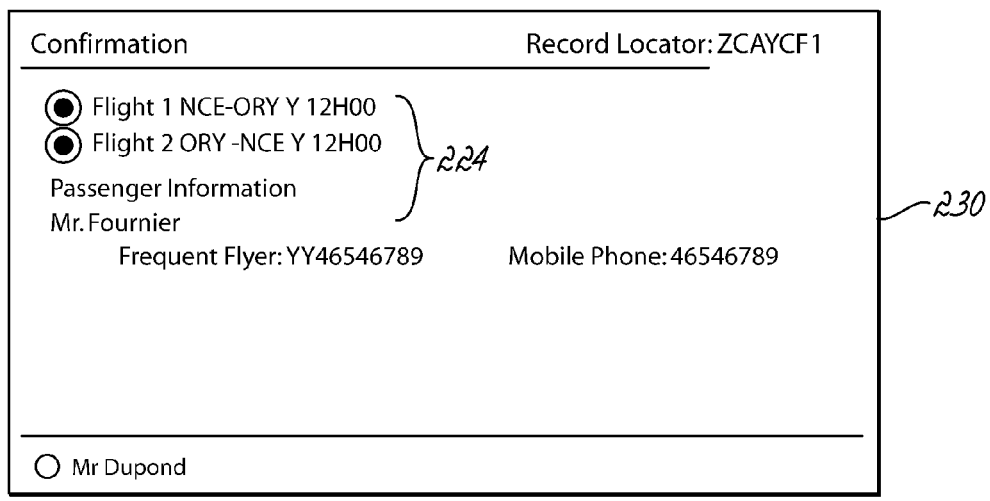
FIG. 15 is a block diagram of an example confirmation page displayed to a traveler by the system referenced in FIG. 1.
Figure 13:
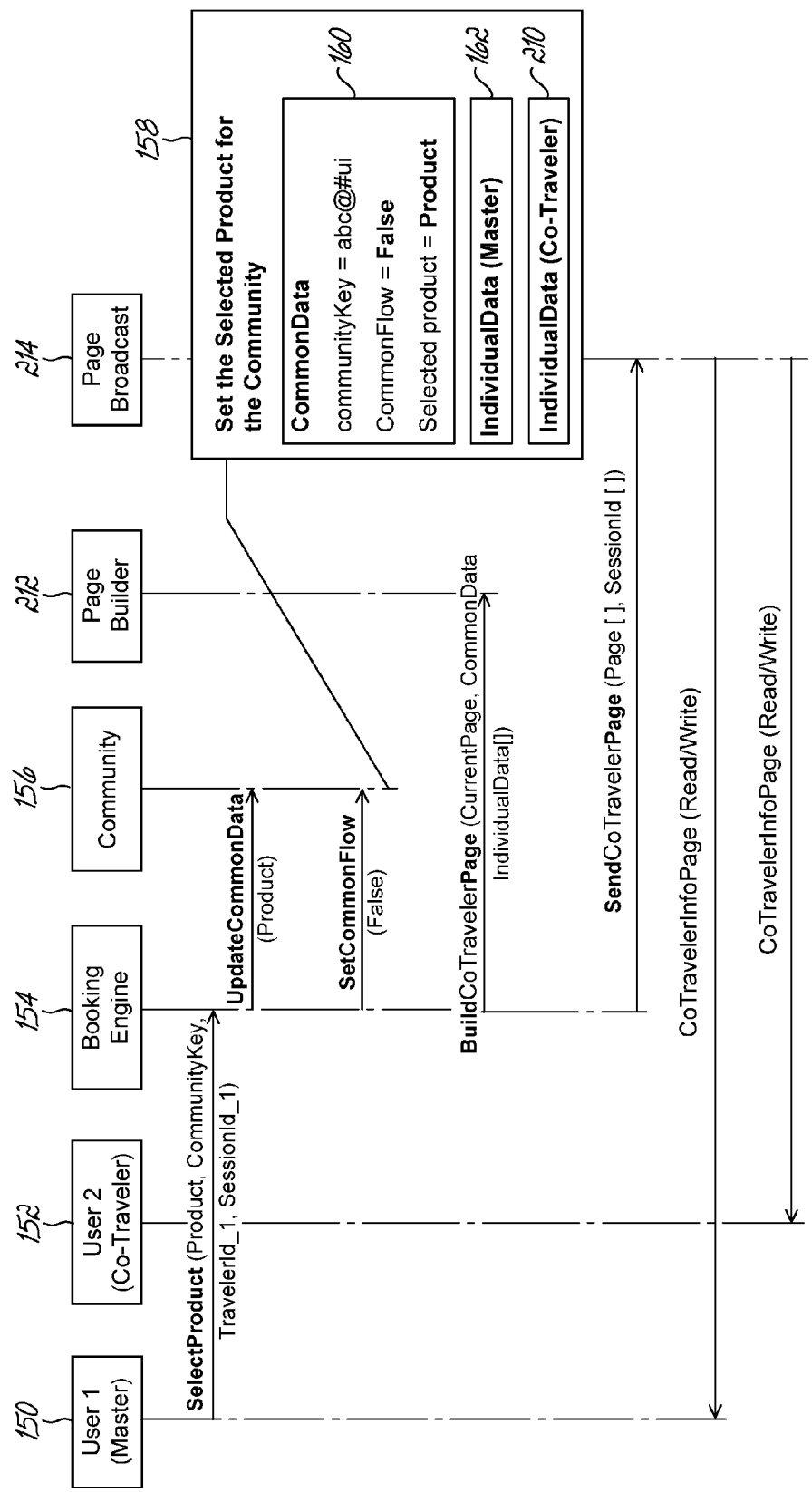
FIG. 13 is a flow diagram illustrating an example common to individual flow performed by the system referenced in FIG. 1.

To further illustrate this concept, FIGS. 11 and 12 illustrate example availability pages 220, 222 that may be displayed to a master traveler and a co-traveler, respectively. Pages 220, 222 display common search results 224; however, in availability page 220 for the master traveler all controls (e.g., radio buttons 226 and select button 228) are enabled, while in availability page 222 for the co-traveler some or all of the controls are disabled, and either grayed out (in the case of radio buttons 226) or hidden entirely (in the case of select button 228). Thus, availability page 220 includes at least one active control that is omitted (i.e., hidden, disabled, or otherwise not present or enabled) from availability page 222.

As such, co-travelers can see details about candidate travel recommendations but they typically cannot select or confirm those travel recommendations. Thus, the master traveler is able to direct, guide and control the collaborative browsing in the common web flow.

Once the itinerary and prices have been selected by the master traveler for the community during the common web flow, a transition occurs from the common phase to the individual phase to enable each traveler (master and co-travelers to complete their respective reservations for the selected travel recommendation (i.e., the community travel recommendation). For example, upon selection of a travel recommendation via select button 228 of master availability page 220, a transition from common to individual flow is performed, e.g., in the manner illustrated in FIG. 13.

As shown in this figure selection of a travel recommendation initiates a SelectProduct request or call to booking engine 154, which in turn updates common data 160 (via an UpdateCommonData call) to store the selected product (travel recommendation) and transition from common flow to individual flow (via a SetCommonFlow call). Booking engine 154 then calls page builder component 212 to build an individualized passenger information page (via a BuildCoTravelerPage call) for each traveler, and then calls page broadcast component 214 to forward an individualized information page (CoTravelerInfoPage) to each traveler. In some embodiments, BuildCoTravelerPage is interpreted within a community concept, whereby an individualized information page may be configured as necessary to enable one co-traveler to input information for him and one or more accompanying travelers such as a spouse, kids, etc.

Thus, in each individualized information page, the respective traveler is permitted to input relevant passenger (traveler) information necessary to complete the booking. This information may include a credit card number or frequent flyer number for example. In order to maintain passenger confidentiality, all information entered in the individual pages may not be shared with the other travelers. In addition, once the transition occurs to individual flow, the master traveler typically has the same role as the other co-travelers.

In some embodiments, selection of a travel recommendation causes an individual shopping basket to be created for each traveler. This basket allows the traveler to store the data entered from the individual web flow.

Figure 14:
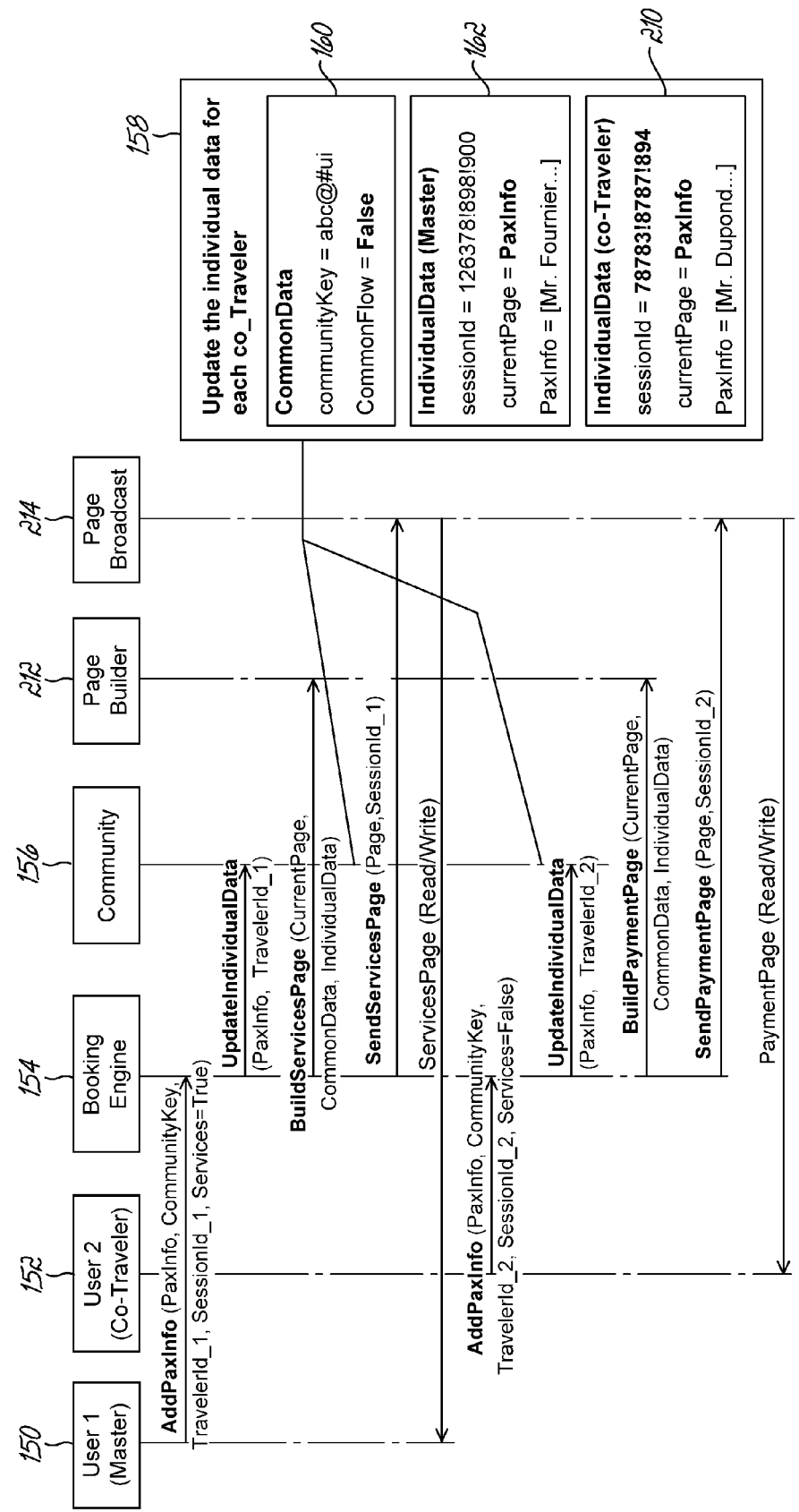
FIG. 14 is a flow diagram illustrating an example individual flow performed by the system referenced in FIG. 1.

The individual web flow may include one or several individual pages, e.g., one page to enter the traveler identity, and one page to enter the credit card data. Moreover, the number of pages in the individual web flow can be different for each co-traveler depending of the options selected during this flow. FIG. 14, for example, illustrates individual flow for the first and second users 150, 152. Each user makes an AddPaxInfo call to booking engine 154 on the respective information page; however, for the first user, additional services are requested (e.g., to select a specific seat, a specific meal, or other optional services). Thus, prior to making a payment, and after updating the individual data for the first user (UpdateIndividualData) booking engine 154 may call page builder component 212 to build a services page (BuildServicesPage) and call page broadcast component 214 to send the services page to the first user (SendServicesPage).

In contrast, for the second user, no services page may be generated, and instead booking engine 154 may, after updating the individual data for the second user, call page builder component 212 to build a payment page (BuildPaymentPage) and call page broadcast component 214 to send the payment page to the first user (SendPaymentPage). It will be appreciated that a similar flow will occur to send a payment page to the first user after the appropriate services have been selected by the first user.

Payments are desirably processed individually for each traveler. So, the community component computes the total amount to pay for each co-traveler, and each is required to provide a form of payment to pay one's share. As soon as all mandatory information has been entered by a co-traveler during the individual web flow then his or her booking is complete.

It will be appreciated that all co-traveler confirmation booking steps may be performed in parallel and thus, totally independent from each other. Nevertheless, they share the same booking reservation, and in the illustrated embodiment, only a single community PNR is created for all travelers.

In the illustrated embodiment, when the first co-traveler confirms a booking, the community PNR is created with his or her personal data and his or her selected products/services. Once his or her booking is complete, he or she receives a confirmation page with a record locator, e.g., as illustrated by confirmation page 230 in FIG. 15.

When the second co-traveler confirms the booking, the community PNR is retrieved by the service and all personal data and selected products/services are added to the community PNR. At the end, the second co-traveler receives a confirmation page with the same record locator.

In addition, in some embodiments, a community status email may be sent to all community travelers each time a co-traveler confirms his or her booking within the community PNR.

Figure 16:
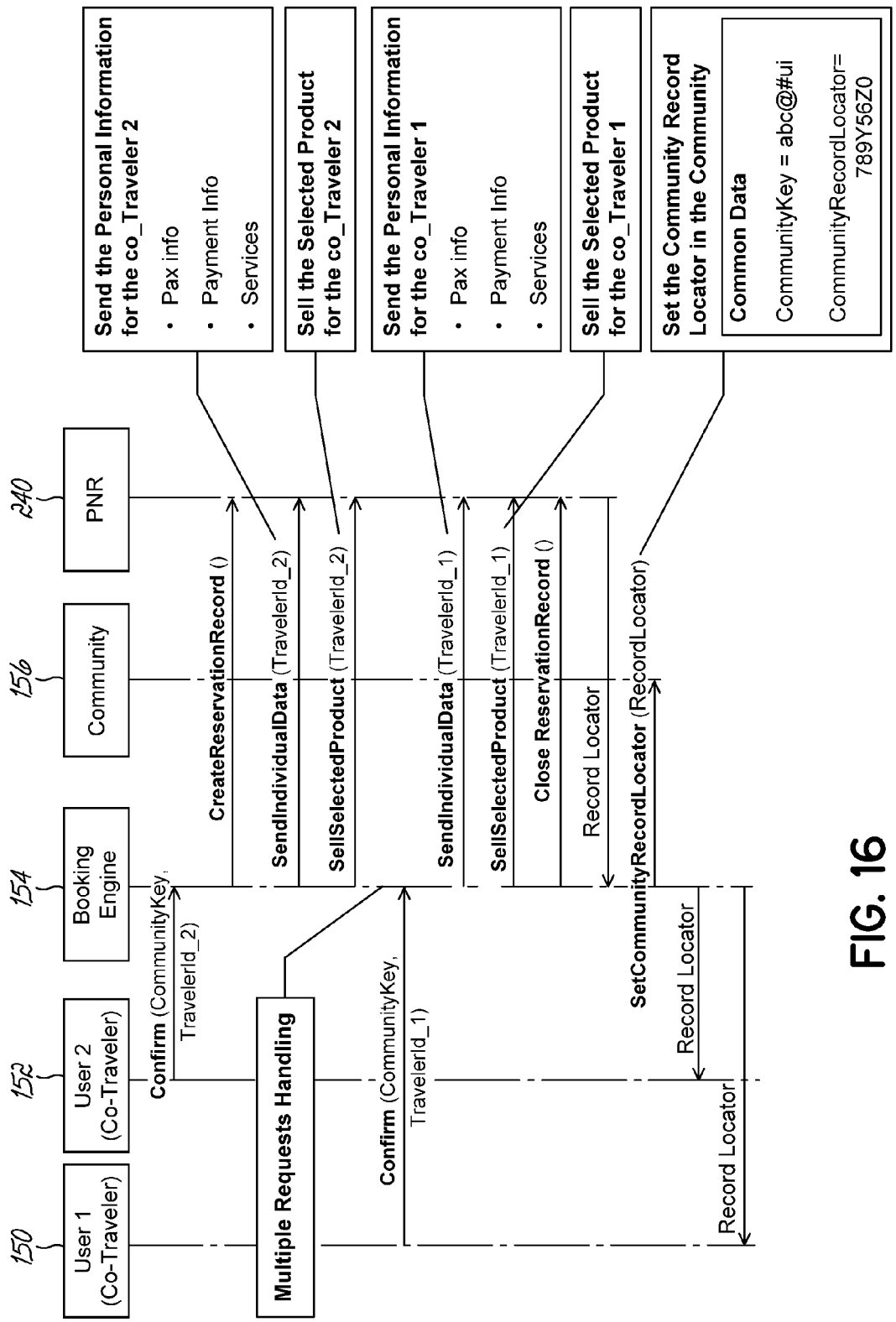
FIG. 16 is a flow diagram illustrating an example synchronous confirmation process performed by the system referenced in FIG. 1.

FIG. 16 illustrates an example, synchronous confirmation flow where travelers are required to confirm in a predetermined sequence. Here, the second user 152 confirms first by making a confirm call to booking engine 154. The booking engine then creates a community reservation record, e.g., a community PNR 240, via a CreateReservationRecord call, adds the individual data to the community PNR (SendIndividualData) and sells the selected travel recommendation for the second user (SellSelectedProduct). Thereafter, the first user 150 confirms by making a confirm call to booking engine 154, and the booking engine adds the individual data to the community PNR (SendIndividualData) and sells the selected travel recommendation for the first user (SellSelectedProduct). The PNR is then closed (CloseReservationRecord) and a record locator is returned to the booking engine. A call is then made to community component 156 to set the community record locator (SetCommunityRecordLocator), which results in record locators being returned to each of the travelers in the community.

Figure 17:
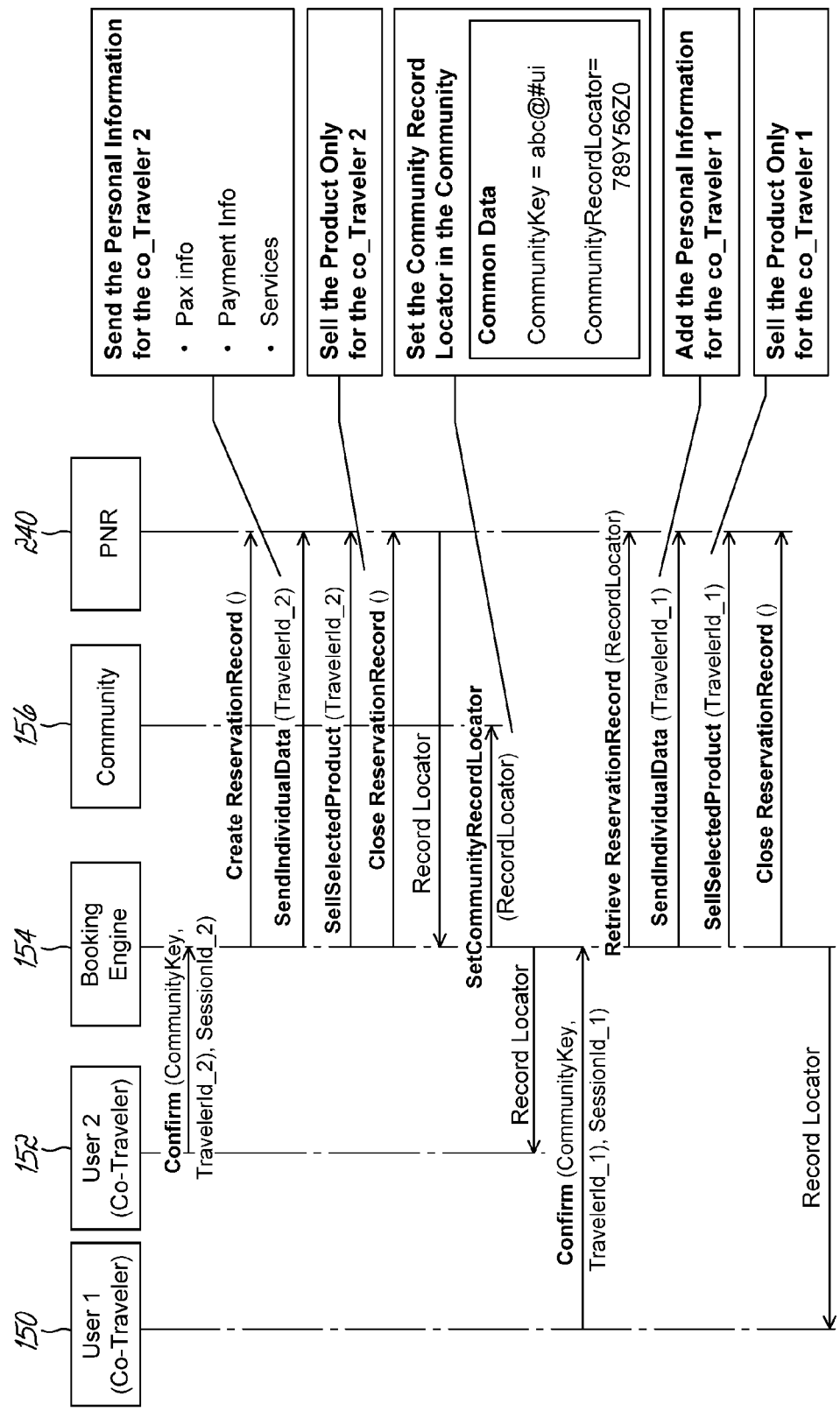
FIG. 17 is a flow diagram illustrating an example asynchronous confirmation process performed by the system referenced in FIG. 1.

FIG. 17 illustrates an alternate asynchronous confirmation flow where travelers are permitted to confirm in any order. Here, the second user 152 is illustrated as confirming first by making a confirm call to booking engine 154. The booking engine then creates a reservation record, e.g. a community PNR 240, via a CreateReservationRecord call, adds the individual data to the community PNR (SendIndividualData) and sells the selected travel recommendation for the second user (SellSelectedProduct). Then the PNR is closed via a CloseReservationRecord call, which returns a record locator. The booking engine then makes a call to community component 156 to set the community record locator (SetCommunityRecordLocator), which results in the record locator being returned to the second user.

Thereafter, the first user 150 confirms by making a confirm call to booking engine 154, and the re-opens the community PNR via a RetrieveReservationRecord call using the same record locator generated when the second user confirmed. The booking engine then adds the individual data to the community PNR (SendIndividualData) and sells the selected travel recommendation for the first user (SellSelectedProduct). The PNR is then closed (CloseReservationRecord) and the record locator is returned to the first user.

In some embodiments, specific attention may be required to properly handle community session and community PNR synchronization updates. This may be performed sequentially to avoid asynchronous change issues. Thus, in case one co-traveler decides to postpone his or her booking confirmation, an email may be sent after a timeout, with all information to let him or her book later. In addition, in the case all co-travelers did not confirm the booking after a predetermined period, a specific strategy may be implemented to cancel the community PNR if the service is set up to require all co-travelers to travel together. In other embodiments, however, a community PNR may be maintained even in the event that one or more co-travelers do not complete their respective reservations. In addition, it may be desirable to allow for co-travelers that have left the community session for some reason, whether voluntary or involuntary (e.g., due to a network or computer problem), to later reconnect and complete the individual flow and thus their respective individual reservations.

In addition, in some embodiments it may be desirable to handle situations where a seat is not available for a co-traveler when confirming a reservation. In some embodiments, another seat to this co-traveler on the same flight, train, etc., e.g., in a different cabin or booking class. Alternatively, the entire community PNR could be canceled, or the other travelers could be notified to edit the community PNR to remove any unconfirmed travelers. In all cases, it is typically desirable for an information email to be sent to the whole community to inform them of the situation.

Various modifications may be made to the illustrated embodiments without departing from the spirit and scope of the invention. For example, where travelers are registered with user accounts, prestored account information may be used to provide traveler information to avoid the need for all individual data to be entered by each traveler. In some embodiments, some co-travelers may not be required to open accounts, and may simply provide information and confirm booking as guests.

In still other embodiments, some co-travelers may not participate in the common flow to select a travel recommendation, but may still participate in the community and make a reservation using the individual flow after others in the community have selected a travel recommendation. In such embodiments, for example, it may be desirable at the completion of the common flow to send an email or other electronic communication to all travelers in a community, or just to those travelers that are not currently online or logged in to the service, so that such travelers can access the service and complete a reservation for a selected travel recommendation.

In addition, in some embodiments, primary co-travelers may purchase or confirm reservations for other accompanying co-travelers, e.g., so that one traveler could enter passenger information and/or purchase reservations for a spouse, children, grand-children, parents, grandparents, other relatives, friends, coworkers, or other acquaintances. For example, in the aforementioned example where two couples were planning a trip together, the wives could participate in a community session to search for and select a particular travel recommendation, and then each wife could complete the reservation for herself and her husband.

Furthermore, in some embodiments, at least a portion of the individual flow may occur prior to the common flow, e.g., so that travelers in a community can enter personal information in advance of collaborative browsing to speed up and/or simplify the confirmation process after a travel recommendation has been selected.

In addition, while the illustrated embodiments above have focused on air travel, other embodiments may enable other travel products to be purchased, and may, for example, be suitable for purchasing combinations of travel products, e.g., to reserve hotel rooms, train tickets, event tickets, rental cars, and/or other travel-related products along with air travel for communities of travelers.

It will be appreciated that some of the features of the exemplary embodiments of this invention may be used without the corresponding use of other features. In addition, various additional modifications may be made without departing from the spirit and scope of the invention. Therefore, the invention lies in the claims hereinafter appended.

What is claimed is:

1. A method of booking travel reservations to create a common trip, the method comprising, with a network accessible computer system:

establishing an online community session for linking together a community of travelers by a processor of the network accessible computer system, wherein the community session includes common data associated with a plurality of travelers and individual data including specific information for each of the plurality of travelers, and wherein establishing the community session includes:

generating a community session identifier for the community session, by the processor, in response to a first traveler among the plurality of travelers providing an indication that a common flow is to be shared, wherein common web pages are shared between the plurality of travelers to create the common trip during the common flow;

communicating the community session identifier to each of the plurality of travelers by the processor;

receiving requests from the plurality of travelers by the processor, wherein each request includes the community session identifier; and associating the requests with the community session by the processor based upon the community session identifier included with the requests matching that of the community session;

interacting collaboratively with the community of travelers, by the processor, through the community session to determine a community travel recommendation by sharing the common web pages between the plurality of travelers;

selecting the community travel recommendation based on an input from the first traveler;

in response to the first traveler selecting the community travel recommendation, transitioning into an individual phase and interacting individually with each of the plurality of travelers in the community of travelers during the individual phase by the processor to complete a reservation of the selected community travel recommendation for each of the plurality of travelers, wherein interacting individually with each of the plurality of travelers includes storing passenger information for each of the plurality of travelers in the individual data;

building an individualized passenger information page for each of the plurality of travelers in the community of travelers by a page builder component of the processor in response to transitioning to the individual phase, wherein the individualized passenger information page includes at least one page for entering payment parameters that enable a selected traveler to purchase the selected community travel recommendation for themselves;

forwarding the individualized passenger information page to each of the plurality of travelers in the community of travelers by the processor, wherein the individual passenger information page allows an individual traveler to enter respective passenger information to complete the reservation of the selected community travel recommendation; and when interacting collaboratively with the community of travelers to select the community travel recommendation, storing a travel search criterion and at least one candidate travel recommendation in the common data of the community session.

2. The method of claim 1, wherein interacting collaboratively with the community of travelers to select the community travel recommendation includes:

searching for candidate travel recommendations in response to at least one request received from the first-traveler; and communicating the candidate travel recommendations identified when searching for candidate travel recommendations to other travelers in the community.

3. The method of claim 2, wherein communicating the candidate travel recommendations includes pushing real time updates to the other travelers in response to user input generated by the first traveler.

4. The method of claim 1, wherein interacting collaboratively with the community of travelers includes causing a plurality of traveler devices respectively associated with the community of travelers to collaboratively browse a travel web site.

5. The method of claim 4, wherein causing the plurality of traveler devices to collaboratively browse the travel web site includes communicating web pages to the plurality of traveler devices.

6. The method of claim 5, wherein causing the plurality of traveler devices to collaboratively browse the travel web site is performed in the common flow and includes:

receiving a plurality of requests from a first traveler device among the plurality of traveler devices and associated with the first traveler, the plurality of requests including a search request and a select request;

in response to the search request:
generating at least one web page including the at least one candidate travel recommendation that matches the travel search criterion associated with the search request; and
communicating the at least one web page to the plurality of traveler devices; and in response to the select request:
selecting a selected community travel recommendation from the at least one candidate travel recommendation; and
transitioning from the common flow to an individual flow.

7. The method of claim 6, wherein interacting individually with each of the plurality of travelers in the community of travelers is performed during the individual flow and includes, for each of the plurality of traveler devices:

communicating at least one individual traveler information web page to a corresponding traveler device;

receiving traveler information from the corresponding traveler device; and completing a reservation for a traveler associated with the corresponding traveler device using the received traveler information.

8. The method of claim 6, wherein the first traveler is a master traveler for the community such that the first traveler directs the collaborative browsing in the common flow.

9. The method of claim 8, further comprising sending an invitation to at least one other traveler in the community of travelers in response to a request from the first traveler.

10. The method of claim 8, wherein generating the at least one web page includes generating a first web page for the first traveler device that is different from a second web page for other traveler devices among the plurality of traveler devices, the first web page including at least one active control omitted from the second web page such that only the first traveler among the community of travelers is permitted to interact with the at least one active control, wherein the select request is generated through interaction with the at least one active control.

11. The method of claim 1, wherein interacting individually with each of the plurality of travelers in the community of travelers is performed synchronously.

12. The method of claim 1, wherein interacting individually with each of the plurality of travelers in the community of travelers is performed asynchronously.

13. The method of claim 1, further comprising maintaining privacy of personal information and payment information of the first traveler in the community session.

14. The method of claim 1, wherein interacting individually with each of the plurality of travelers in the community of travelers includes interacting asynchronously with the first traveler in the community of travelers to complete the reservation of the selected community travel recommendation for the first traveler after the first traveler has disconnected from the community session.

15. The method of claim 1, wherein each request from each of the plurality of travelers further includes a traveler identifier, the method further comprising associating a first request with the first traveler among the plurality of travelers based upon the traveler identifier included with the first request.

16. The method of claim 1, further comprising generating a unique reservation record including reservation information for each of the plurality of travelers in the community of travelers, wherein the unique reservation record comprises a community passenger name record (PNR), the community PNR including reservation information for all of the plurality of travelers and being distinct from a group PNR or an individual PNR.

17. The method of claim 1, further comprising generating a unique reservation record including reservation information for each of the plurality of travelers in the community of travelers, wherein the unique reservation record comprises a plurality of linked passenger name records (PNRs).

18. The method of claim 1, wherein interacting individually with each of the plurality of travelers includes interacting with the first traveler among the plurality of travelers to complete the reservation of the selected community travel recommendation for the first traveler.

19. The method of claim 1, wherein interacting individually with each of the plurality of travelers includes interacting with the first traveler among the plurality of travelers to complete reservations of the selected community travel recommendation for the first traveler and for a second, accompanying traveler.

20. The method of claim 1, wherein interacting collaboratively with the community of travelers to select the community travel recommendation includes broadcasting the common web pages to multiple travelers among the community of travelers to update the multiple travelers in real time, and wherein interacting individually with each of the plurality of travelers in the community of travelers to complete the reservation of the selected community travel recommendation for each of the plurality of travelers includes collecting personal information from the plurality of travelers.

21. The method of claim 20, wherein broadcasting the common web pages to multiple travelers includes customizing the broadcast web pages for display on different traveler devices.

22. The method of claim 20, wherein interacting individually with each of the plurality of travelers includes generating a single community passenger name record (PNR) including reservation information for the plurality of travelers.

23. The method of claim 1, wherein the passenger information includes personal information and payment information.

24. The method of claim 1, wherein interacting collaboratively includes communicating electronic messages between the plurality of travelers.

25. A community travel booking system for creating a common trip, comprising:

at least one processor; and program code configured upon execution by the at least one processor to book travel reservations by:

establishing an online community session for a community of travelers, wherein the community session includes common data associated with each of a plurality of travelers and individual data including specific information for each of the plurality of travelers, and wherein establishing the community session includes:

generating a community session identifier for the community session in response to a first traveler among the plurality of travelers providing an indication that a common flow is to be shared, wherein common web pages are shared between the plurality of travelers to create the common trip during the common flow;

communicating the community session identifier to each of the plurality of travelers;

receiving requests from the plurality of travelers, wherein each request includes the community session identifier; and associating the requests with the community session based upon the community session identifier included with the requests matching that of the community session;

interacting collaboratively with the community of travelers through the community session to determine a community travel recommendation by sharing the common web pages between the plurality of travelers;

selecting the community travel recommendation based on an input from the first traveler;

in response to the first traveler selecting the community travel recommendation, transitioning into an individual phase and interacting individually with each of the plurality of travelers in the community of travelers during the individual phase to complete a reservation of the selected community travel recommendation for each of the plurality of travelers, wherein interacting individually with each of the plurality of travelers includes storing passenger information for each of the plurality of travelers in the individual data;

building an individualized passenger information page for each of the plurality of travelers in the community of travelers by a page builder component of the at least one processor in response to transitioning to the individual phase, wherein the individualized passenger information page includes at least one page for entering payment parameters that enable a selected traveler to purchase the selected community travel recommendation for themselves;

forwarding the individualized passenger information page to each of the plurality of travelers in the community of travelers, wherein the individual passenger information page allows an individual traveler to enter respective passenger information to complete the reservation of the selected community travel recommendation; and when interacting collaboratively with the community of travelers to select the community travel recommendation, storing a travel search criterion and at least one candidate travel recommendation in the common data of the community session.

26. The community travel booking system of claim 25, wherein the passenger information includes personal information and payment information.

27. A program product, comprising:

a non-transitory computer readable medium; and program code stored on the non-transitory computer readable medium and upon execution by at least one processor, books travel reservations to create a common trip by:

establishing an online community session for a community of travelers, wherein the community session includes common data associated with each of a plurality of travelers and individual data including specific information for each of the plurality of travelers, and wherein establishing the community session includes:

generating a community session identifier for the community session in response to a first traveler among the plurality of travelers providing an indication that a common flow is to be shared, wherein common web pages are shared between the plurality of travelers to create the common trip during the common flow;

communicating the community session identifier to each of the plurality of travelers;

receiving requests from the plurality of travelers, wherein each request includes the community session identifier; and associating the requests with the community session based upon the community session identifier included with the requests matching that of the community session;

interacting collaboratively with the community of travelers through the community session to determine a community travel recommendation;

selecting the community travel recommendation based on an input from the first traveler;

in response to the first traveler selecting the community travel recommendation, transitioning to an individual phase and interacting individually with each of the plurality of travelers in the community of travelers during the individual phase to complete a reservation of the selected community travel recommendation for each of the plurality of travelers, wherein interacting individually with each of the plurality of travelers includes storing passenger information for each of the plurality of travelers in the individual data;

building an individualized passenger information page for each of the plurality of travelers in the community of travelers by a page builder component of the at least one processor in response to transitioning to the individual phase, wherein the individualized passenger information page includes at least one page for entering payment parameters that enable a selected traveler to purchase the selected community travel recommendation for themselves;

forwarding the individualized passenger information page to each of the plurality of travelers in the community of travelers, wherein the individual passenger information page allows an individual traveler to enter respective passenger information to complete the reservation of the selected community travel recommendation; and when interacting collaboratively with the community of travelers to select the community travel recommendation, storing a travel search criterion and at least one candidate travel recommendation in the common data of the community session.

28. The program product of claim 27, wherein the passenger information includes personal information and payment information.

* * * * *